United States Patent [19]

Russ

[11] Patent Number: 5,582,390
[45] Date of Patent: Dec. 10, 1996

[54] DRIVE APPARATUS WITH PRIMARY AND SECONDARY NO-BACK FEATURES

[75] Inventor: David E. Russ, Rockford, Ill.

[73] Assignee: Sundstrand Corporation, Rockford, Ill.

[21] Appl. No.: 340,938

[22] Filed: Nov. 17, 1994

[51] Int. Cl.$^6$ .......................... B64C 13/00; F16H 57/10; F16H 57/12
[52] U.S. Cl. .......................................................... 244/75 R
[58] Field of Search ........................ 294/75 R; 192/7, 192/8 R; 74/424.8, 411.15

[56] References Cited

U.S. PATENT DOCUMENTS

| | | | |
|---|---|---|---|
| 2,543,482 | 2/1951 | Williams | 192/7 |
| 2,590,610 | 3/1952 | Grosch | 254/187 |
| 2,653,691 | 9/1953 | Weiland | 192/8 |
| 2,747,709 | 5/1956 | Bennett | 192/7 |
| 3,802,281 | 4/1974 | Clarke | 192/7 |
| 3,898,890 | 8/1975 | Simmons et al. | 74/89.15 |
| 4,697,672 | 10/1987 | Linton | 188/134 |
| 4,762,205 | 8/1988 | Ortman | 188/71.2 |
| 4,770,054 | 9/1988 | Ha | 192/7 |
| 4,834,225 | 5/1989 | Klopfenstein et al. | 192/7 |
| 5,287,950 | 2/1994 | Feathers et al. | 192/8 R |

Primary Examiner—Andres Kashnikow
Assistant Examiner—Virna Lissi Mojica
Attorney, Agent, or Firm—Lawrence E. Crowe

[57] ABSTRACT

A linear ballscrew type actuator including a bi-directional no-back device having both primary and secondary no-back features is provided. The secondary no-back features only become active following a failure of the primary no-back features, thereby ensuring maximum reliability by precluding wear or fatigue of the secondary no-back components during normal operation of the actuator. The secondary no-back features are provided by secondary pawl mechanisms mounted at the distal end of an articulated eccentric arm. The angular position of the eccentric arm is utilized to annunciate the operational condition of the no-back device. Angular motion of the eccentric arm is utilized to trigger engagement of a secondary locking device, upon failure of the primary no-back features.

22 Claims, 5 Drawing Sheets

DRIVE APPARATUS WITH PRIMARY AND SECONDARY NO-BACK FEATURES

TECHNICAL FIELD

This invention relates to drive mechanisms, and more particularly to a no-back device having both primary and secondary no-back features for use in drive mechanisms.

BACKGROUND

In many drive systems operatively connecting a prime mover to a load moved by the drive system, it is necessary to provide a no-back device. The primary function of these no-back devices is to prevent an aiding load from over-running the drive, and/or prevent an opposing load from reversing the drive. Some no-backs also function to provide a small amount of braking during operation of the drive to dampen load oscillations.

Drive systems requiring such no-back functions are commonly found in winches, and in actuation systems for movable aircraft flight control surfaces, such as flaps, slats, or horizontal stabilizers. In these systems, it is essential that the driven load remain as positioned by the drive system, despite the forces of gravity, or aerodynamic buffeting which create aiding or opposing loads. For example, a winch must be capable of reliably holding a load in an elevated position, and of lowering the load in a controlled manner in order to be useful, and to prevent the possibility of damage to the load or injury to operating personnel. An aircraft control surface must remain in the position desired by the flight crew, or the flight characteristics of the aircraft will be seriously degraded.

A typical no-back device includes a releasable brake acting on a shaft operably connected to the drive apparatus. If the no-back is required to be bi-directional, a pair of releasable brakes will generally be utilized, with one brake resisting unwanted motion of the shaft, in one direction, and the second brake resisting unwanted shaft motion in the opposite direction.

Although many types of hydraulic, pneumatic, electrical, or mechanical devices have been utilized to activate/deactivate the releasable brakes in no-back devices, simple mechanical devices are often preferred due to their ruggedness, reliability, low cost, and small size and weight.

In one commonly used mechanical activation/deactivation approach, a rachet and pawl mechanism is utilized to actuate a brake acting on a surface of the shaft. The ratchet wheel is mounted to rotate about a common axis with the shaft. The pawl mechanism is generally pivotably or slidably mounted in a housing surrounding the shaft and the rachet wheel. A series of ratchet teeth on the ratchet wheel, and the pawl mechanism are configured such that the ratchet wheel may rotate freely in one direction, with the pawl ratcheting across, but not engaging, the rachet teeth. The ratchet teeth and the pawl are further configured such that the pawl will engage the ratchet teeth and prevent rotation of the ratchet wheel in the opposite direction, however. A friction producing surface or device is provided between the ratchet wheel and the shaft such that when the shaft is rotated in the one direction, the rachet wheel will rotate freely with the shaft. Should the shaft try to rotate in the opposite direction, however, the ratchet and pawl mechanism will lock-up and prevent the ratchet wheel from rotating with the shaft. In order for the shaft to more further, therefore, there would have to be relative motion between the shaft and the ratchet wheel. This motion will be resisted by the friction producing surface or device, however, thereby preventing unwanted motion of the load. Examples of devices utilizing such ratchet and pawl mechanisms are provided in U.S. Pat. Nos.: 4,697,672; 4,834,225; 4,762,205; and 2,653,691.

In some instances it is desired to have a finer degree of control, i.e. less back motion, than can be obtained by a single pawl mechanism. By adding additional pawls, spaced to operate sequentially on different teeth of the ratchet wheel, such finer control can be achieved. U.S. Pat. No. 2,653,691 illustrates such an arrangement. In the '691 patent, a pair of pawls 44 are angularly displaced about a friction ring 42 in such a manner that the pawls 44 will successively engage teeth 43 of the friction ring 42 within an angular movement of the friction ring equal to one-half of the angle between adjacent teeth.

While the no-back devices described above work well in some applications, further improvement is required. Particularly, it is an object of my invention to provide a no-back device which incorporates a secondary, or fail safe, no-back function in addition to the primary no-back function provided by the prior no-back devices described above. This secondary no-back function is essentially dormant as long as the primary no-back elements are functioning properly. Following a failure of the primary no-back function, however, the secondary no-back function of my invention is immediately activated, thereby allowing continued safe operation of the drive apparatus until such time as the primary no-back function can be restored.

By requiring that the secondary no-back features only become active following a failure of the primary no-back features, wear and fatigue of the secondary no-back components is precluded. System reliability is therefore improved in comparison to prior no-back devices which utilized redundant primary no-back features that were fully active during all operating conditions.

Other objects of my invention include: providing annunciation of the failure of the primary no-back function to alert operators and repair personnel; and providing a locking feature, actuated by activation of the secondary no-back function, which will allow the drive mechanism to only drive the load in one direction, i.e. back to a neutral or safe position, following activation of the secondary no-back function.

SUMMARY

My invention achieves the above-stated objects in a drive apparatus operatively connecting a prime mover to a load. The drive apparatus of my invention includes a no-back device having a shaft, rotatable about an axis, and operably connected within the drive apparatus to be rotated by the prime mover, or by movement of the load. The no-back device also includes a first releasable brake means for resisting motion of the shaft in one direction about the axis. The first brake means includes both a primary and a secondary no-back means for resisting the rotation of the shaft in the one direction, with the secondary no-back means only resisting rotation in the one direction following a failure of the primary no-back means to resist rotation of the shaft in the one direction.

According to one aspect of my invention, the secondary no-back function is provided by a secondary pawl mechanism acting upon a ratchet wheel only in the event of a failure of a primary pawl mechanism which provides the primary no-back function of that ratchet wheel. Thus should the primary no-back mechanism fail due to a broken primary pawl, or a missing tooth in the ratchet wheel, the secondary no-back function will immediately be activated, thereby allowing continued safe operation of the drive apparatus.

According to another aspect of my invention, the no-back device also includes a second brake means for resisting motion of the shaft in the opposite direction, thereby providing bi-directional no-back capability. Like the first brake means, the second brake means of my invention also includes both primary and secondary no-back means.

According to a preferred embodiment of my invention, the secondary no-back mechanism includes a secondary pawl pivotably mounted on the distal end of an eccentric arm which is pivotably attached for angular movement within a housing surrounding the no-back mechanism. The angular position of this eccentric arm provides annunciation of the failure of the primary no-back function in a straightforward manner. The angular movement of the eccentric arm is also utilized to trigger secondary locking mechanisms which allow the drive mechanism to drive the load in only one direction, toward a neutral or safe position, following activation of the secondary no-back function.

These and other aspects and advantages of my invention will be apparent to those skilled in the art upon consideration of the following drawing figures and detailed description of an exemplary embodiment of my invention.

DESCRIPTION OF PREFERRED EMBODIMENTS

Figure 1:
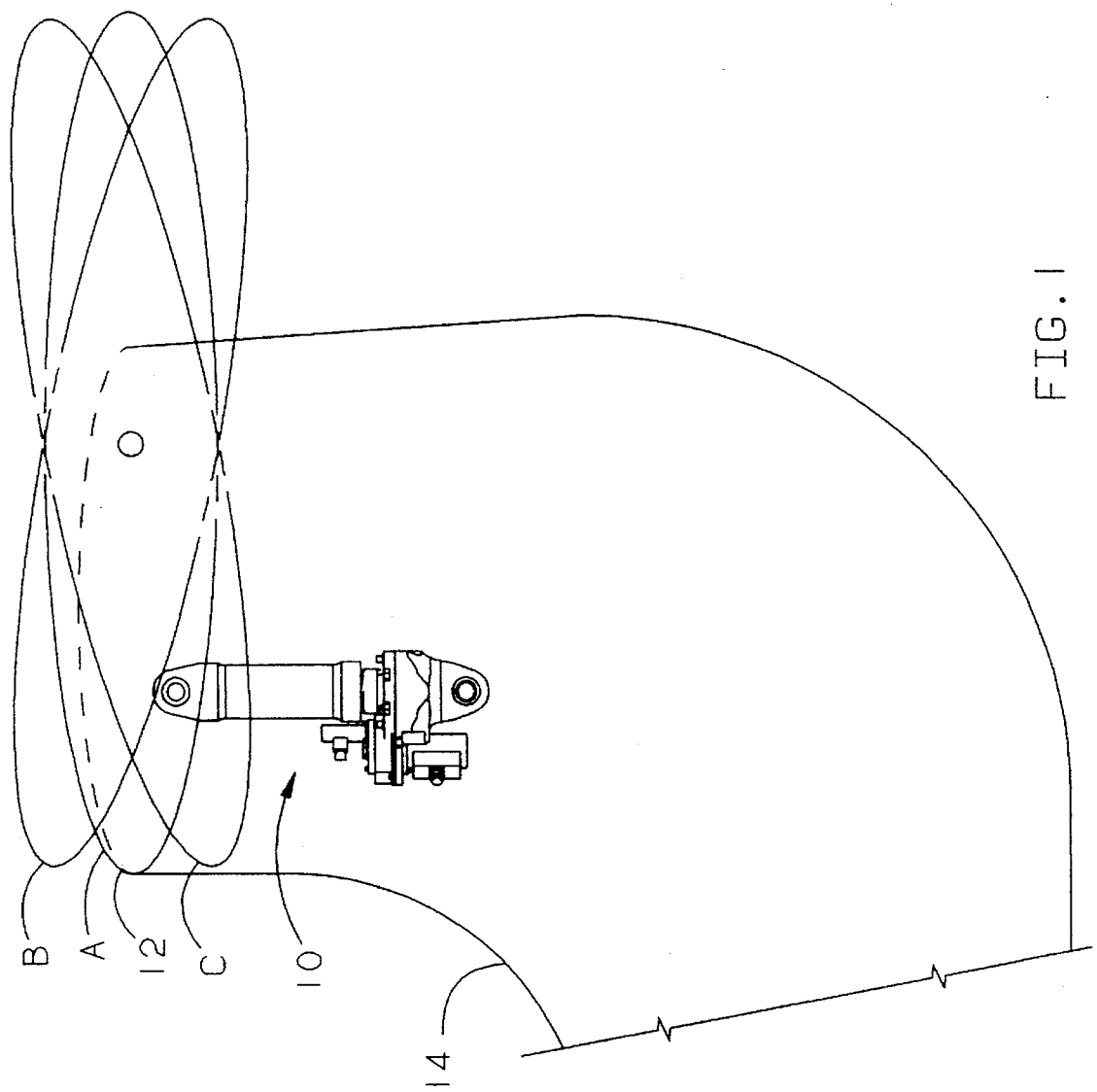
FIG. 1 is a schematic representation of an exemplary embodiment of an actuator according to my invention for moving a horizontal stabilizer on the tail of an aircraft, the position and extent of actuation of that stabilizer being exaggerated for ease of understanding.

FIG. 1 depicts an exemplary embodiment of a drive apparatus according to my invention, in the form of an actuator 10 for moving a horizontal stabilizer 12 on the tail of an aircraft 14. By extending or retracting the actuator 10, the horizontal stabilizer 12 may be positioned in an initial position A, preferred for take-off or landing of the aircraft, or alternatively in any position bounded by positions B and C to trim the aircraft during flight.

Figure 2:
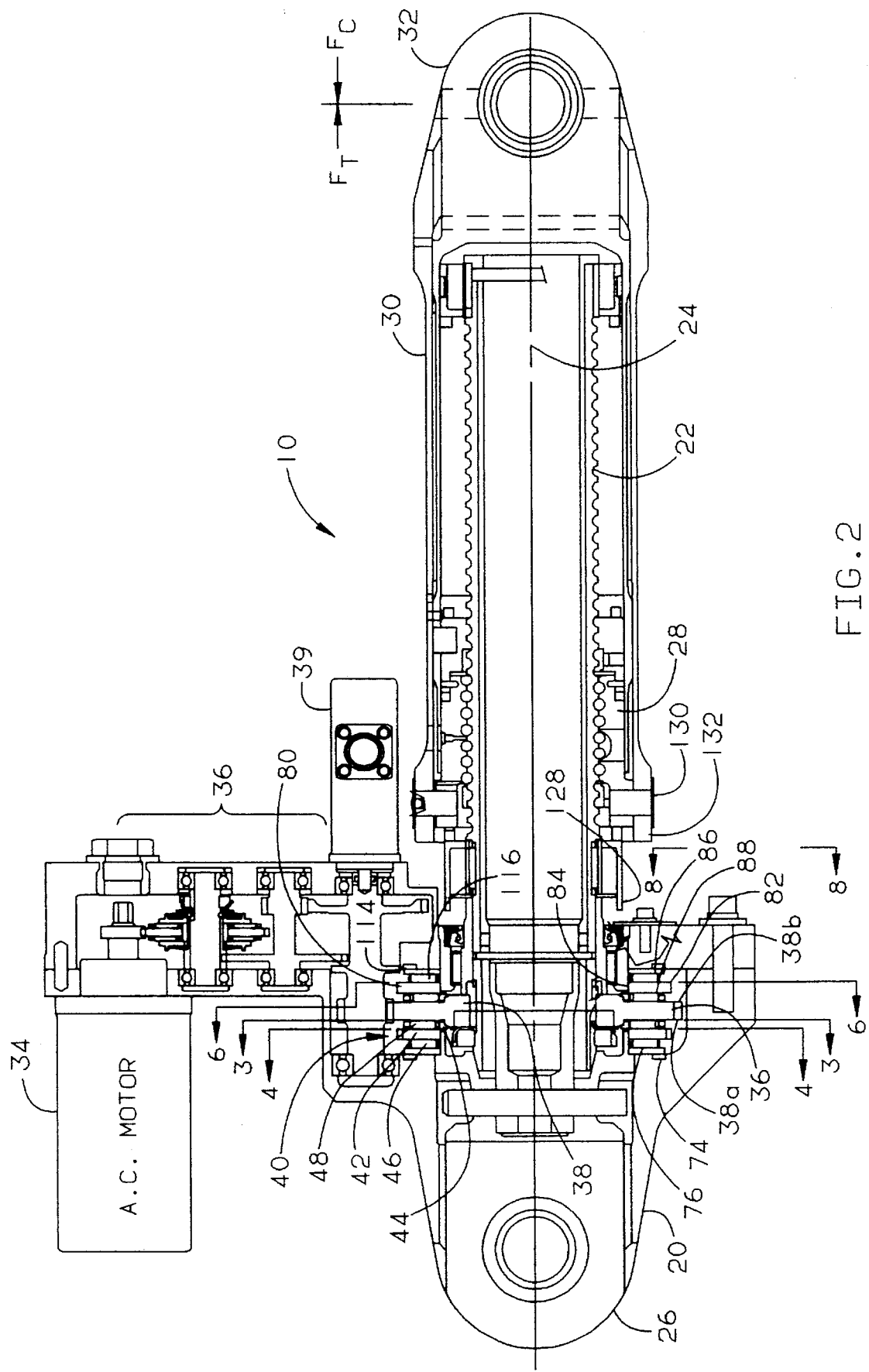
FIG. 2 is a longitudinal cross-sectional view of the actuator of FIG. 1.

As shown in FIG. 2, the actuator 10 includes a fixed housing 20, having extending therefrom a shaft, in the form of a ballscrew 22, mounted within the fixed housing 20 for rotation about an axis 24. An appertured ear 26 extends from the fixed housing 20, axially opposite the ballscrew 22, for pivotal attachment of the actuator 10 to the aircraft 14. A recirculating ballnut 28 is mounted on the ballscrew 22 for translational movement along the axis 24. A movable housing 30 is fixedly attached to the ballnut 28 for translational movement therewith. A second appertured ear 32, attached to the end of the movable housing 30 opposite the fixed housing 30, is provided for pivotal attachment of the actuator 10 to the horizontal stabilizer 12.

An AC motor 34 is provided to drive the ballscrew 22 via a bull gear 38, fixedly attached to the ballscrew 22, and an intermediate geartrain, generally designated 36. A resolver 39, connected to one of the elements of the geartrain 38, provides a feedback signal indicating the position of the actuator 10, and thus also the position of the horizontal stabilizer 12.

The actuator 10 includes a bi-directional no-back device capable of resisting either tension or compression loads imposed on the actuator 10 by the horizontal stabilizer 12. The no-back device includes the bull gear 38, and first and second brake means 40, 80 disposed on opposite axial sides of the bull gear 38. These brake means are configured to apply braking friction against one or the other of the axially facing sides 38a, b of the bull gear 38 in response to tension or compression loads applied to the ballscrew 22 via the ballnut 28.

Figure 3:
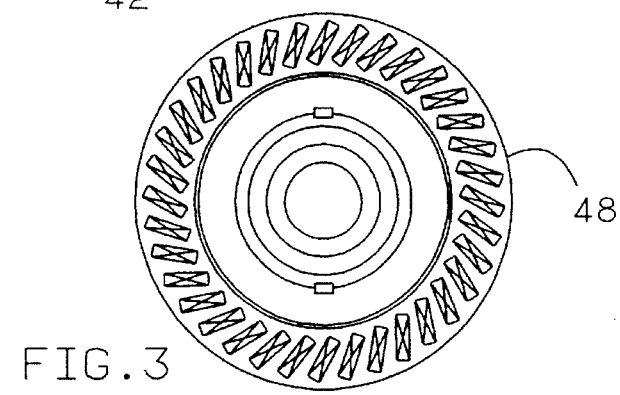
FIG. 3 is a lateral cross-sectional view taken along Line 3—3 in FIG. 2.

Specifically, the first brake means 40 is operative upon the left face 38a of the bull gear 38, as depicted in FIG. 2, to resist unwanted clockwise (CW) rotation of the ballscrew 22, as viewed from the right end of FIG. 2. The first brake means 40 includes a first ratchet wheel 42 supported by a radial journal bearing 44 and a thrust bearing 46 for rotation, independent from the ballscrew 22, about the axis 24. A friction producing device in the form of a skewed axis roller bearing 48 is sandwiched between the ratchet wheel 42 and the axial face 38a of the bull gear 38. The skewed axis roller bearing is best seen in FIG. 3.

Figure 4:
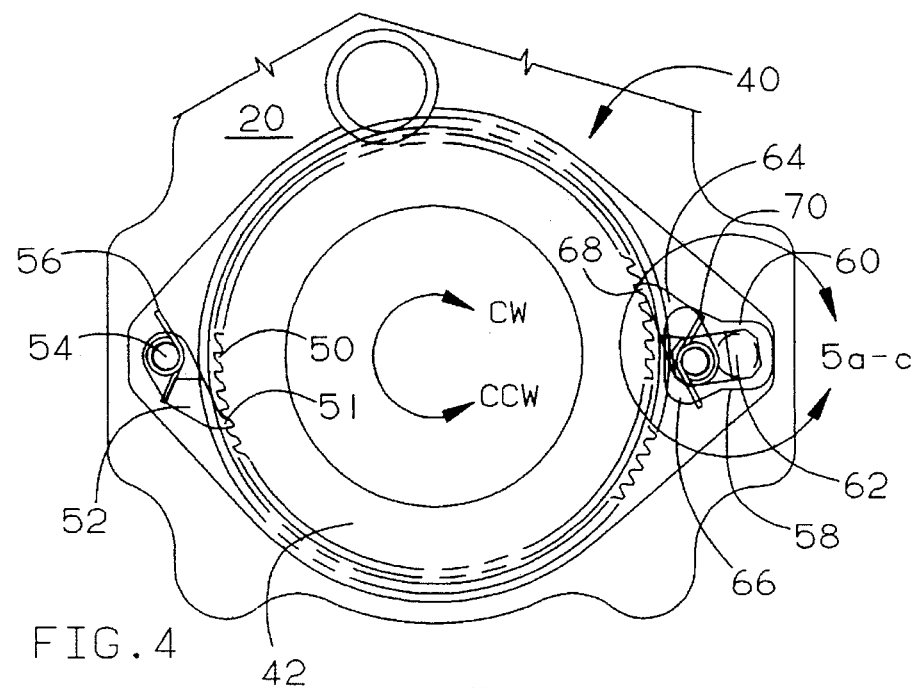
FIG. 4 is a lateral cross-sectional view taken along Line 4—4 in FIG. 2.

As shown in FIG. 4, the first ratchet wheel 42 includes on its radial periphery a circumferentially spaced array of ratchet teeth 50 adapted to mate with the distal end 51 of a primary pawl 52, pivotally attached to the housing 20 by a pin 54. A torsion spring 56 provides a rotational force to keep the primary pawl 52 in contact with the ratchet teeth 50. Specifically, the primary pawl 52 and the ratchet teeth 50 are configured such that when the first ratchet wheel 42 is rotated in a counterclockwise (CCW) direction, the primary pawl will ratchet across, but not engage with, the ratchet teeth 50. If an attempt is made to rotate the first ratchet wheel 42 in the opposite clockwise direction, however, the distal end 51 of the primary pawl 52 will engage the ratchet teeth 50, thereby preventing further clockwise rotation of the first ratchet wheel 42. A wavy spring 74 and a load plate 76 provide an axial force urging the first brake means into contact with the face 38a of the bull gear 38. A compressive load Fc applied to the actuator 10 by the horizontal stabilizer also serves to press the bull gear 38 into contact with the first brake means 40.

From the description given thus far, it will be understood that the first brake means 40 will rotate essentially freely with the ballscrew 22 and bull gear 38 in the counterclockwise direction. But if an attempt is made to rotate the ballscrew in the clockwise direction, the first ratchet wheel 42 will be prevented from rotating by action of the primary pawl 52. Relative rotational motion will thus be required between the first ratchet wheel 42 and the bull gear 38. This relative rotation will cause the skewed axis roller bearing 48 to exert a braking force on the surface 38a of the bull gear 38, thus resisting the CW motion imparted by compressive load Fc on ballscrew 22.

As best seen in FIGS. 4 and 5a–c, the first brake means 40 of my invention also includes means for providing a secondary no-back function. These secondary no-back means include a first eccentric arm 58 having one end thereof pivotably mounted in a recess 60 of the housing 20 to allow angular rotation of the first eccentric arm within a plane parallel to an axis of rotation of the first ratchet wheel 42, about a pivot point 62 which is located radially outward of the first ratchet wheel 42, along a line extending generally radially and perpendicularly through the axis 24. A secondary pawl 64 is pivotably attached at a first end thereof to the distal end of the first eccentric arm 58 for pivotal movement about a second pivot point 66. The distal end 68 of the secondary pawl 64 is configured to engage the ratchet teeth 50 of the first ratchet wheel 42. A torsion spring 70 provides a rotational force urging the secondary pawl into contact with the ratchet teeth 50 of the first ratchet wheel 42. As in the case of the primary pawl 52, the secondary pawl will ratchet across the ratchet teeth, without engaging said teeth, so long as the first ratchet wheel 42 is rotated in the counterclockwise direction.

Figure 5A:
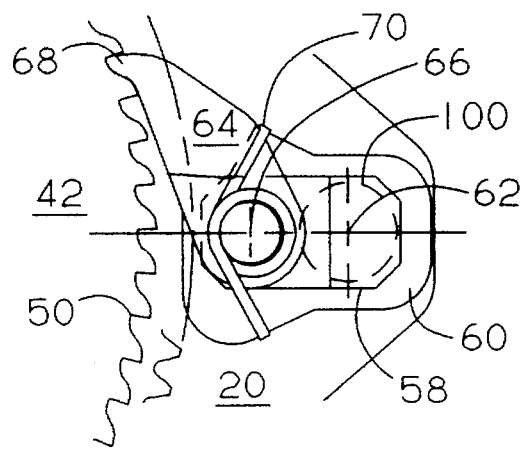
FIGS. 5a–c are partial sectional views, taken as indicated in FIG. 4, showing a secondary pawl mechanism of a first brake means in several operating positions.

If an attempt is made to rotate the first ratchet wheel in the clockwise direction, however, the distal end 68 of the secondary pawl 64 will engage the ratchet teeth 50 at a first angular position, as shown in FIG. 5a, and begin to rotate the first eccentric arm 58 in a CCW direction about the pivot point 66. Under normal operating conditions, the primary pawl 52 will lock the first ratchet wheel 42 against further CW rotation when the eccentric arm 58 is in the intermediate angular position indicated in FIG. 5b. Under such normal conditions, the secondary no-back function provided by the secondary pawl 64 is essentially dormant, with only a slight angular rotation of the eccentric arm 58 being created.

Figure 5B:
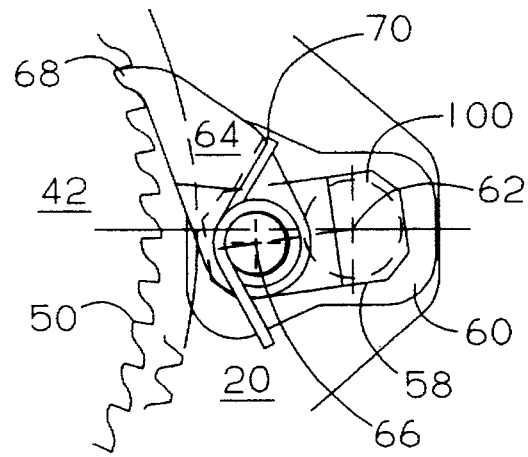
Figure 5C:
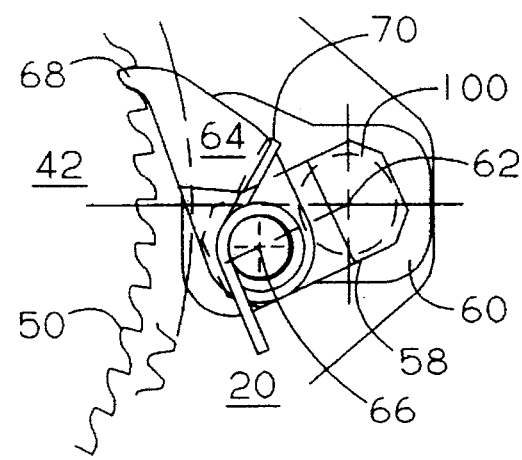

Should the primary no-back function, provided by the primary pawl 52, fail to prevent CW rotation of the first ratchet wheel 42, however, the eccentric arm 58 would continue to rotate in a CCW direction, past the intermediate angular position indicated in FIG. 5b, to a second angular position as indicated in FIG. 5c whereat the eccentric arm 58 would encounter stop means in the form of a wall 72 of the cavity 60 in the housing 20. The wall 72 will thus prevent further CCW rotation of the eccentric arm 58 and further CW rotation of the first ratchet wheel 42, thus providing the secondary no-back function of the first brake means 40. The skewed axis roller bearing 48 will then provide braking force to resist further CW rotation of the ballscrew in the same manner as previously described with respect to action of the primary no-back features of the first brake means.

In addition to its primary function as described above, the angular position of the eccentric arm 58 provides a convenient annunciation device indicating which of the no-back devices, i.e. the primary or the secondary pawl 52, 64 respectively, is operating to prevent further unwanted CW rotation of the first ratchet wheel 42. Thus if a failure, such as inter alia, a broken primary pawl 52, a broken torsion spring 56, or a missing ratchet tooth 50, has occurred in the primary no-back means, that failure is indicated by the eccentric arm 58 being positioned as shown in FIG. 5c when an attempt is made to drive the ballscrew 22 in the CW direction.

Figure 6:
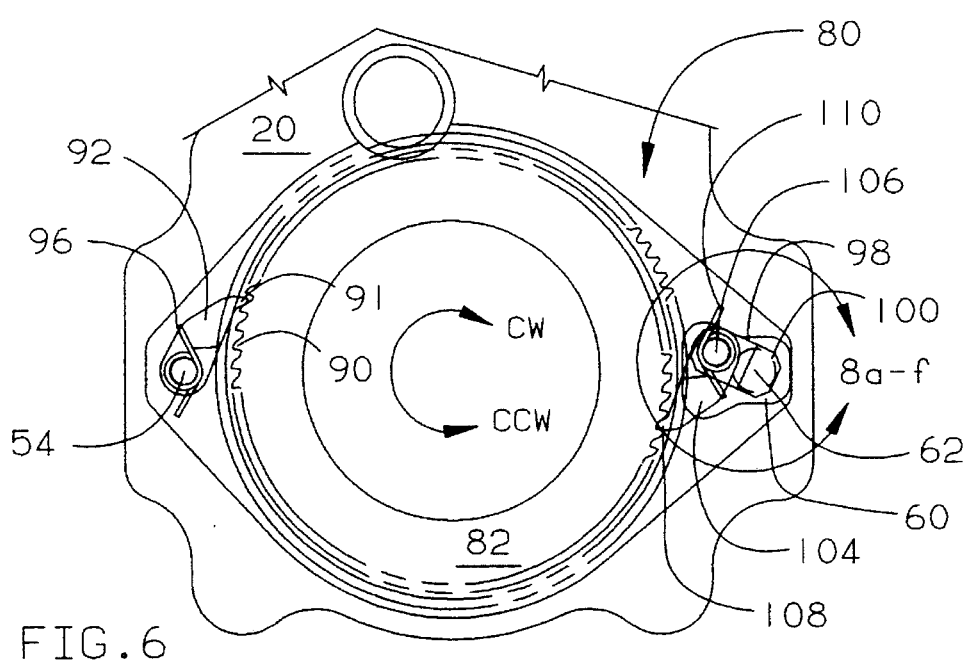
FIG. 6 is a lateral cross-sectional view taken along Line 6—6 in FIG. 2.

As shown in FIGS. 2 and 6, the second brake means 80 is operative upon the right face 38b of the bull gear 38, as depicted in FIG. 2, to resist unwanted counterclockwise (CCW) rotation of the ballscrew 22. The second brake means 80 includes a second ratchet wheel 82 supported by a radial bearing 84 and a thrust bearing 86 for rotation, independent from the ballscrew, about the axis 24. A friction producing device in the form of a skewed axis roller bearing 88 is sandwiched between the second ratchet wheel 82 and the axial face 38b of the bull gear 38. The skewed axis roller bearing 88 is of the same type as is illustrated in FIG. 3.

As shown in FIG. 6, the second ratchet wheel 82 includes on its radial periphery a circumferentially spaced array of ratchet teeth 90 adapted to mate with the distal end 91 of a primary pawl 92, pivotably attached to the housing 20 by the same pin 54 used to mount the primary pawl 52 of the first brake means 90. A torsion spring 96 provides a rotational force to keep the primary pawl 92 in contact with the ratchet teeth 90. Specifically, the primary pawl 92 and the ratchet teeth 90 are configured such that when the second ratchet wheel 82 is rotated in a clockwise (CW) direction, the primary pawl 92 will ratchet across, but not engage with, the ratchet teeth 90. If an attempt is made to rotate the second ratchet wheel 82 in the opposite counterclockwise direction, however, the distal end 91 of the primary pawl 92 will engage the ratchet teeth 90, thereby preventing further counterclockwise rotation of the second ratchet wheel 82. A wavy spring 114 and a load plate 116 provide an axial force urging the second brake means into contact with the right face 38b of the bull gear 38. A tensile load Ft applied to the actuator 10 by the horizontal stabilizer also serves to urge the bull gear 38 into contact with the second brake means 80.

The second brake means 80 will, therefore, rotate essentially freely with the ballscrew 22 and bull gear 38 in the clockwise direction. But if an attempt is made to rotate the ballscrew 22 in the counterclockwise direction, the second ratchet wheel 82 will be prevented from rotating by action of the primary pawl 92. Relative rotational motion will thus be required between the second ratchet wheel 82 and the bull gear 38. This relative rotation will cause the skewed axis roller bearing 88 to exert a braking force on the right surface 38b of the bull gear 38, thus resisting the CCW motion of the ballscrew 22.

As best seen in FIGS. 6 and 7a–c, the second brake means 80 of my invention also includes means for providing a secondary no-back function in a manner essentially identical that previously described with respect to the first brake means 40. These secondary no-back means include a second eccentric arm 98 having one end thereof pivotably mounted in the recess 60 of the housing 20 to allow angular rotation of the second eccentric arm within a plane parallel to an axis of rotation of the second ratchet wheel 82, about the pivot point 62. Specifically, both the first and second eccentric arms 58, 98 are fixedly attached to a common carrier shaft 100 journalled for rotation within the housing 20 about the pivot point 62. The first and second eccentric arms 58, 98 are both attached to the carrier shaft in the same angular position with respect to the pivot point 62. A secondary pawl 104 is pivotably attached at a first end thereof to the distal end 108 of the second eccentric arm 98 for pivotal movement about a second pivot point 106. The distal end 108 of the secondary pawl 104 is configured to engage the ratchet teeth 90 of the second ratchet wheel 92. A torsion spring 110 provides a rotational force urging the secondary pawl into contact with the ratchet teeth 90 of the second ratchet wheel 92. As in the case of the primary pawl 92, the secondary pawl 104 will ratchet across the ratchet teeth 90, without engaging said teeth, so long as the second ratchet wheel 82 is rotated in the clockwise direction.

Figure 7A:
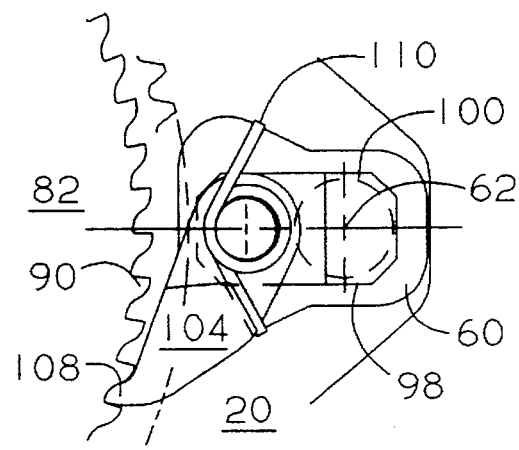
FIGS. 7a–c are partial sectional views, taken as indicated in FIG. 6, showing a secondary pawl mechanism of a second brake means in several operating positions.

If an attempt is made to rotate the second ratchet wheel 82 in the counterclockwise direction, however, the distal end 108 of the secondary pawl 104 will engage the ratchet teeth 90 at a first angular position, as shown in FIG. 7a, and begin to rotate the second eccentric arm 98 in a CW direction about the pivot point 66. Under normal operating conditions, the primary pawl 92 will lock the second ratchet wheel 82 against further CW rotation when the eccentric arm 98 is in the intermediate angular position indicated in FIG. 7b. Under such normal conditions, the secondary no-back function provided by the secondary pawl 104 is essentially dormant, with only a slight angular rotation of the eccentric arm 108 to the intermediate angular position illustrated in FIG. 7b being created.

Figure 7B:
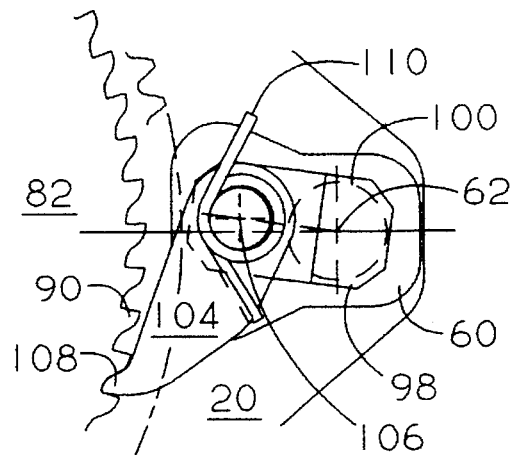
Figure 7C:
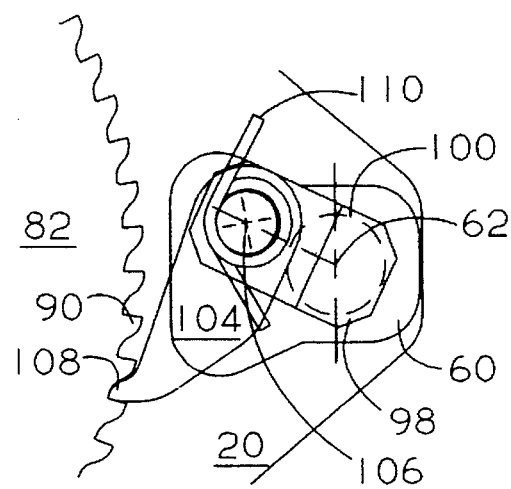

Should the primary no-back function, provided by the primary pawl 92, fail to prevent CCW rotation of the second ratchet wheel 82, however, the eccentric arm 98 would continue to rotate in a CW direction, past the intermediate angular position indicated in FIG. 7b, to a second angular position as indicated in FIG. 7c whereat the eccentric arm 98 would encounter stop means in the form of a wall 112 of the cavity 60 in the housing 20. The wall 112 will thus prevent further CW rotation of the eccentric arm 98 and further CCW rotation of the second ratchet wheel 92, thus providing the secondary no-back function of the second brake means 80. The skewed axis roller bearing 88 will then provide braking force to resist further CCW rotation of the ballscrew in the same manner as previously described with respect to action of the primary no-back features of the second brake means 80.

Just as in the case of the first brake means, the angular position of the eccentric arm 98 or the carrier shaft 100 thus provides a convenient annunciation device indicating which of the no-back devices, i.e. the primary or the secondary pawl 92, 104 respectively, is operating to prevent further unwanted CCW rotation of the second ratchet wheel 82. Thus if a failure, such as inter alia, a broken primary pawl 92, a broken torsion spring 96, or a missing ratchet tooth 90, has occurred in the primary no-back means of the second brake means 80, that failure is indicated by the eccentric arm 98 being positioned as shown in FIG. 7c when an attempt is made to drive the ballscrew 22 in the CCW direction.

Figure 8A:
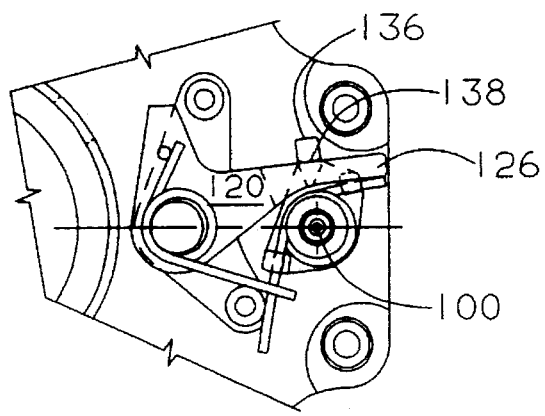
FIGS. 8a–f are partial views, taken along Line 8—8 in FIG. 2, showing a ballscrew locking pawl and trigger mechanism in several operating positions.
Figure 8D:
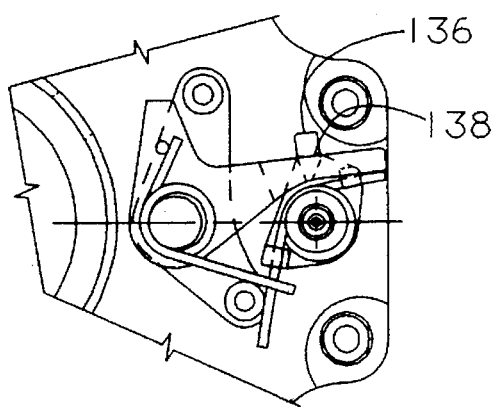
Figure 8B:
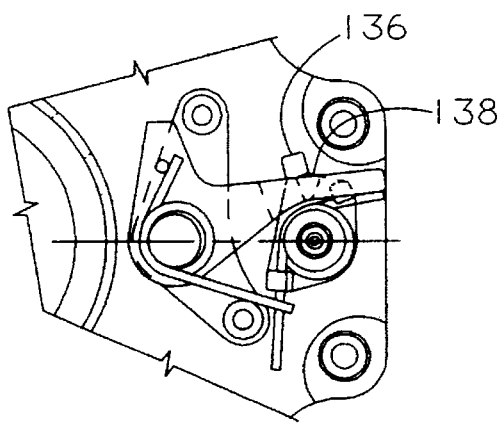
Figure 8E:
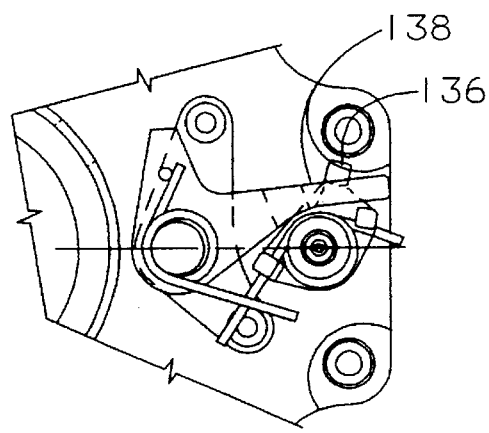
Figure 8C:
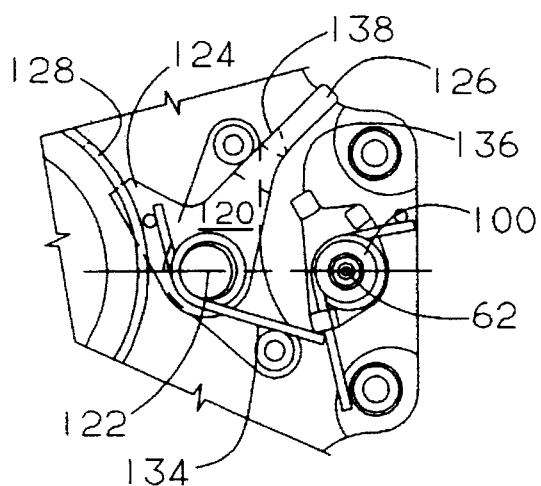
Figure 8F:
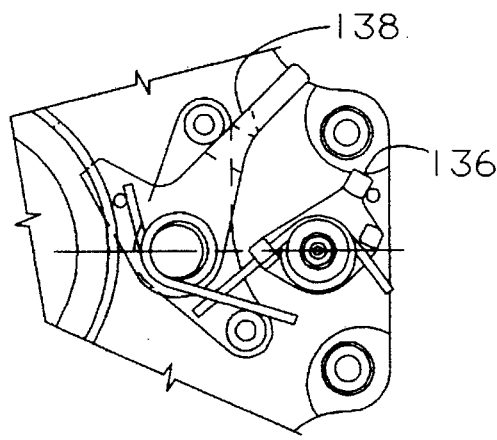

In order to facilitate the annunciation function provided by the carrier shaft 100, and to trigger a ballscrew lock pawl mechanism, the carrier shaft 100 of the exemplary embodiment is extended through the housing 20 and equipped with triggering means, as shown in FIGS. 8a–f, for an externally visible ballscrew lock pawl mechanism. FIGS. 8a–c correspond respectively with the angular positions of the first eccentric arm 58 and carrier shaft 100 depicted in FIGS. 5a–c. FIGS. 8d–f correspond respectively with the angular positions of the second eccentric arm 98 and the carrier shaft 100 depicted in FIGS. 5d–f. In preferred embodiments, shafts 62 and 100 can be the same shaft.

As shown in FIG. 8c, the ballscrew locking pawl 120 is pivotably mounted for rotation about a pivot point 122 located radially inward of the carrier shaft 100 along a radial line passing through the axis 24 and the pivot point 62. The locking pawl 120 has extending generally radially therefrom a first arm 124 and a second arm 126. The first arm 124 is configured to engage a tang 128 extending axially from a shock absorber mechanism 130 attached to the ballscrew 22, as best seen in FIG. 2. The shock absorber 130 contains a viscoelastic material 132 which will "wind up" and stop clockwise rotation of the ballscrew 22 whenever the first arm 124 of the ballscrew locking pawl 120 is engaged with the tang 128 of the shock absorber 130. A torsion spring 134 acting on the locking pawl 120 preferentially biases the locking pawl 120 into engagement with the tang 128. In the actuator 10 of the exemplary embodiment, engagement of the ballscrew locking pawl 120 and the tang 128 prevents further extension of the actuator 10. The locking pawl 120, the tang 128, and the spring 134 are configured to allow the ballscrew 22 to rotate freely in the counterclockwise direction, however, so that the actuator 10 may be retracted.

The second arm 126 of the ballscrew locking pawl 120 is configured to latch into an "armed" position, as illustrated in FIG. 8a, with a triggering finger 136 extending from the carrier shaft 100. Specifically, the second arm 124 includes a triangular boss 138, extending axially therefrom, which is configured to engage the finger 136 extending from the carrier shaft 100 until such time as either of the secondary pawls 64, 104 becomes active due to failure of either of the primary no-back mechanisms.

As will be understood by considering FIGS. 5a–b, 7a–b, and 8a, b, d, e in conjunction with the previous descriptions of the secondary no-back functions and the ballscrew locking pawl 120 of my invention, the locking pawl 120 is locked out of engagement with the tang 128 of the shock absorber 130, so long as the bi-directional no-back functions are provided by the primary pawls 52 and 92 of the first and second brake means 40, 80 respectively. Should either of the primary no-back means fail, however, such that either of the secondary pawls 64, 104 must provide the no-back function, as discussed with respect to FIGS. 5c and 7c, the finger 136 of the carrier shaft 100 will release the locking pawl 120, as seen in FIGS. 8c and 8f, thereby preventing further clockwise rotation of the ballscrew 22, and thus also preventing further extension of the actuator 10. Lack of ballscrew extension can provide an airborne annunciation means to alert the pilot so that repairs may be made after landing.

The locking pawl 120 is physically positioned on an outer surface of the housing 20, as is the triggering finger of the carrier shaft 100. By observing the positions of these features, maintenance personnel can quickly ascertain the operational readiness of the no-back functions of the actuator 10. With both primary no-back functions operating properly, the locking pawl 120 will be in the "armed" position as indicated in FIGS. 8a, b, d or e. As the ballscrew 22 is rotated in the clockwise direction, the triggering finger 136 will rotate to the angular position indicated in FIG. 8b, but no further. As the ballscrew 22 is rotated in the counterclockwise direction, the finger 136 will rotate to the angular position shown in FIG. 8e, but no further.

Should either of the primary no-back mechanisms in the first or second brake means 40, 80 fail, however, the ballscrew locking pawl 120 will be released by the finger 136, providing easily visible annunciation of the failure to alert service personnel to the need for repair. If the finger 136 rotates to the angular position indicated in FIG. 8c, upon an attempt to rotate the ballscrew 22 in the CW direction, the problem is in the primary no-back mechanism of the first brake means 40. Conversely, if the finger 136 rotates to the angular position shown in FIG. 8f, upon an attempt to rotate the ballscrew 22 in the CCW direction (with the locking pawl 120 temporarily overridden manually by the technician) the problem is in the primary no-back mechanism of the second brake means 80.

In normal operation of the actuator 10, the motor 34, in combination with the geartrain 36, and the bull gear 38 produce sufficient torque to overcome the resistance of either the first or second brake means 40, 80 and drive the ballscrew 22 to position the horizontal stabilizer 12. Specifically, if commanded to extend, the motor 34 will drive the ballscrew 22 in the clockwise direction, thereby causing the ballnut 28 and movable housing to move toward the right in FIG. 2. The first brake means 40 will resist this motion, thereby providing desirable system damping, and, the second brake means 100 will be essentially inactive. When the desired position of the horizontal stabilizers is achieved, the motor 34 will be shut off, and the first and second brake means 40, 80 will provide the previously described bi-directional no-back functions. To retract the actuator 10, the motor 34 will drive the ballscrew 22 in the counterclockwise direction, thereby causing the ballnut 28 to translate toward the left in FIG. 2. The second brake means 80 will provide damping in the form of braking force on the bull gear 38 during retraction, and the first brake means 40 will be essentially inactive, turning freely with the ballscrew 22. Should either of the primary no-back mechanism fail, however, the secondary no-back mechanisms will immediately and automatically provide the necessary no-back function, thereby preventing loss of control over the position of the horizontal stabilizer.

On the basis of the descriptions above, those skilled in the art will readily recognize that my invention provides a highly desirable secondary no-back capability which may be incorporated into a wide range of drive mechanisms in a straightforward manner. In addition to the basic no-back function provided, those skilled in the art will also recognize that the eccentric arm of my invention provides a straightforward means for annunciating drive system operational readiness, and for triggering secondary control mechanisms such as the ballscrew locking pawl of the exemplary embodiment.

Those skilled in the art will further recognize that, although I have described my invention herein with respect to specific embodiments and applications thereof, many other embodiments and applications of my invention are possible within the scope of my invention as described in the appended claims. For example, the skewed axis roller bearings 48, 88 were preferably selected due to the small variation between static and dynamic coefficiencies of friction which this type of bearing provides. Other types of friction producing devices such as traditional clutch plates, or carbon buttons may also be utilized in practicing my invention. Furthermore, the no-back mechanisms of my invention are not limited to use with ballscrew-type actuators. They would find utility in a wide variety of other drive mechanisms. The failure annunication function shown in FIGS. 8a–8f could also be provided by other means, such as an electronic sensor.

The particular ballscrew locking scheme described in the exemplary embodiment was selected primarily for illustrative purposes. For a horizontal stabilizer, it is generally preferable to have the stabilizer positioned within the area bounded by positions A and C in FIG. 1, rather than in the area between A and B to promote a safe landing. The illustrated scheme would therefore allow the horizontal stabilizer to be driven back to the preferred area, following a failure of one of the primary no backs, but would not allow the stabilizer to be driven further toward a position considered less desirable for landing the aircraft. In other embodiments of my invention other arrangements might be preferable.

It is therefore understood that the spirit and scope of the appended claims should not be limited to the specific embodiments described and depicted herein.

I claim:

1. In a drive apparatus operatively connecting a prime mover to a load moved thereby, a no-back mechanism including:

a shaft, rotatable about an axis, and operably connected within said drive apparatus to be rotated by said prime mover or by movement of said load; and first brake means for resisting rotation of said shaft in one direction about said axis;

said first brake means including both a primary and a secondary no-back means for resisting said rotation of said shaft in said one direction, with said secondary no-back means only resisting said rotation in said one direction following a failure of said primary no-back means to resist said rotation in said one direction.

2. The drive apparatus of claim 1 further including annunciation means for indicating a failure of the primary no-back means of the first brake means.

3. The drive apparatus of claim 1 further including:

second brake means for resisting rotation of said shaft in an opposite direction about said axis;

said second brake means including both a primary and a secondary no-back means for resisting said rotation of said shaft in said opposite direction, with said secondary no-back means of said second brake means only resisting said rotation in said opposite direction following failure of said primary no-back means of said second brake means to resist said rotation of said shaft in said opposite direction.

4. The drive apparatus of claim 3 further including annunciation means for indicating a failure of the primary no-back means in either the first or the second brake means.

5. The drive apparatus of claim 4 further including locking means for locking said drive apparatus against further movement of said load in a first direction, following a failure of the primary no-back means of either said first or second brake means, but allowing said prime mover to continue to move said load in said second direction, following said failure of said primary no-back means of said first or second brake means.

6. The drive apparatus of claim 5 wherein said locking means are operatively connected to said secondary no-back means of said first and said second brake means to be automatically triggered thereby following a failure of said primary no-back means of said first or said second brake means.

7. The drive apparatus of claim 1 wherein:

said no-back mechanism includes a housing about said shaft;

said shaft includes an axially facing surface; and said first brake means includes:

a ratchet wheel mounted concentricly about said shaft and adjacent said axially facing surface of the shaft in a manner allowing said ratchet wheel to rotate independently of said shaft about said axis, in a plane of rotation perpendicular to said axis;

said ratchet wheel including a plurality of ratchet teeth disposed thereupon in a circumferential array about said axis, and also having an axially facing surface disposed to face said axially facing surface of said shaft:

friction producing means operatively disposed between said axially facing surfaces of said first ratchet wheel and said shaft for resisting relative motion between said shaft and said ratchet wheel;

primary pawl means operatively attached to said housing in a manner allowing said ratchet wheel to rotate freely about said axis in said one direction, but to engage said ratchet teeth and prevent said ratchet wheel from rotating in an opposite direction about said axis; and secondary pawl means operatively attached to said housing in a manner allowing said ratchet wheel to rotate freely about said axis in said one direction, but to engage said ratchet teeth and prevent said ratchet wheel from rotating in said opposite direction about said axis following failure of said primary pawl means to prevent rotation of said ratchet wheel in said opposite direction;

said secondary pawl means only being operative to prevent said rotation in the opposite direction following failure of the primary pawl means to prevent such rotation in the opposite direction.

8. The drive apparatus of claim 7 wherein said secondary pawl means includes:

an eccentric arm having one end thereof pivotably mounted to allow angular rotation of the arm between a first and a second angular position, within a plane parallel to said plane of rotation of said ratchet wheel, about a pivot point located along a line extending generally perpendicularly and radially through said axis;

a secondary pawl having a first end thereof pivotably attached to a distal end of said arm;

said secondary pawl having a distal end thereof configured to engage said ratchet teeth when said ratchet wheel is rotating in said opposite direction, and to ride across said ratchet teeth without engagement with said ratchet teeth when said ratchet wheel is rotated in said one direction; and stop means for preventing angular rotation of said arm past said second angular position by reacting forces transferred to said arm, as a result of the engagement of said pawl with said ratchet wheel, into said housing, thereby locking said ratchet wheel against further rotation in said opposite direction.

9. The drive apparatus of claim 8 further including spring means for urging said pawl into contact with said ratchet teeth.

10. The drive apparatus of claim 3 wherein:

said no-back mechanism includes a housing about said shaft;

said shaft includes an axially facing surface; and said second brake means includes:

a ratchet wheel mounted concentricly about said shaft and adjacent said axially facing surface of the shaft in a manner allowing said ratchet wheel to rotate independently of said shaft about said axis, in a plane of rotation perpendicular to said axis;

said ratchet wheel including a plurality of ratchet teeth disposed thereupon in a circumferential array about said axis, and also having an axially facing surface disposed to face said axially facing surface of said shaft:

friction producing means operatively disposed between said axially facing surface of said ratchet wheel and said shaft for resisting relative motion between said shaft and said ratchet wheel;

primary pawl means operatively attached to said housing in a manner allowing said ratchet wheel to rotate freely about said axis in said opposite direction, but to engage said ratchet teeth and prevent said ratchet wheel from rotating in said one direction about said axis; and secondary pawl means operatively attached to said housing in a manner allowing said ratchet wheel to rotate freely about said axis in said opposite direction, but to engage said ratchet teeth and prevent said ratchet wheel from rotating in said one direction about said axis following failure of said-primary pawl means to prevent rotation of said ratchet wheel in said one direction;

said secondary pawl means only being operative to prevent said rotation in said one direction following failure of the primary pawl means to prevent such rotation in said one direction.

11. The drive apparatus of claim 10 wherein said secondary pawl means includes:

an eccentric arm having one end thereof pivotably mounted to allow angular rotation of the arm between a first and a second angular position, within a plane parallel to said plane of rotation of said ratchet wheel, about a pivot point located along a line extending generally perpendicularly and radially through said axis;

a secondary pawl having a first end thereof pivotably attached to a distal end of said arm;

said secondary pawl having a distal end thereof configured to engage said ratchet teeth when said ratchet wheel is rotating in said one direction, and to ride across said ratchet teeth without engagement with said ratchet teeth when said ratchet wheel is rotated in said opposite direction; and stop means for preventing angular rotation of said arm past said second angular position by reacting forces transferred to said arm, as a result of the engagement of said pawl with said ratchet wheel, into said housing, thereby locking said ratchet wheel against further rotation in said one direction.

12. The drive apparatus of claim 11 further including spring means for urging said pawl into contact with said ratchet teeth.

13. A no-back mechanism including:

a housing;

a shaft mounted within said housing for rotation about an axis in either a clockwise or a counterclockwise direction;

first brake means for resisting rotation of said shaft in said clockwise direction about said axis;

second brake means for resisting rotation of said shaft in a counterclockwise direction about said axis;

each of said first and second brake means including:

a ratchet wheel, having ratchet teeth attached thereto, mounted for rotation independently of said shaft about said axis;

primary pawl means operatively connected between said housing and said ratchet wheel in a manner allowing said ratchet wheel to rotate freely in one direction but to engage said ratchet teeth and prevent further rotation of said ratchet wheel in an opposite direction;

secondary pawl means including:

an eccentric arm having one end thereof pivotably mounted to allow angular rotation of the arm between a first and a second angular position, within a plane parallel to said plane of rotation of said ratchet wheel, about a pivot point located along a line extending generally perpendicularly and radially through said axis;

a secondary pawl having a first end thereof pivotably attached to a distal end of said eccentric arm;

said secondary pawl having a distal end thereof configured to engage said ratchet teeth when said ratchet wheel is rotating in said opposite direction, and to ride across said first ratchet teeth without engagement with said first ratchet teeth when said first ratchet wheel is rotated in said one direction; and stop means for preventing angular rotation of said eccentric arm past said second angular position by reacting forces transferred to said arm as a result of the engagement of said secondary pawl with said ratchet wheel, into said housing, thereby locking said ratchet wheel against further rotation in said opposite direction.

14. The drive apparatus of claim 13 further including spring means for urging said secondary pawls into contact with said ratchet teeth.

15. The drive apparatus of claim 13 further including annunciation means for sensing and communicating an angular position of said eccentric arms as an indicator of a failure of the primary pawl means.

16. The drive apparatus of claim 13 further including means for locking said shaft against rotation in one direction following a failure of said primary pawl means, with said means for locking being operatively connected to sense and be triggered by an angular position of one of said eccentric arms.

17. In an aircraft having a movable control surface, and an actuator operatively connected to move said control surface, said actuator including:

first brake means for resisting movement of said control surface in one direction with respect to said aircraft;

said first brake means including both a primary and a secondary no-back means for resisting said movement of said control surface in said one direction, with said secondary no-back means only resisting said movement in said one direction following a failure of said primary no-back means to resist said movement in said one direction; and second brake means for resisting movement of said control surface in an opposite direction with respect to said aircraft;

said second brake means including both a primary and a secondary no-back means for resisting said movement of said control surface in said opposite direction, with said secondary no-back means of said second brake means only resisting said movement in said opposite direction following a failure of said primary no-back means of said second brake means to resist said movement in said opposite direction.

18. The aircraft of claim 17 wherein:

at least one of said first or second brake means includes a ratchet wheel journalled for rotation about an axis; and said secondary no-back means of said at least one of first or second brake means includes:

an eccentric arm having one end thereof pivotably mounted to allow angular rotation of the arm between a first and a second angular position, within a plane parallel to said plane of rotation of said ratchet wheel, about a pivot point located along a line extending generally perpendicularly and radially through said axis;

a secondary pawl having a first end thereof pivotably attached to a distal end of said arm;

said secondary pawl having a distal end thereof configured to engage said ratchet teeth when said ratchet wheel is rotating in said opposite direction, and to ride across said ratchet teeth without engagement with said ratchet teeth when said ratchet wheel is rotated in said one direction; and stop means for preventing angular rotation of said arm past said second angular position by reacting forces transferred to said arm, as a result of the engagement of said pawl with said ratchet wheel, into said actuator, thereby locking said ratchet wheel against further rotation in said opposite direction.

19. The aircraft of claim 18 further including annunciation means for sensing and communicating an angular position of said eccentric arm as an indicator of a failure of the primary no-back means.

20. The drive apparatus of claim 18 further including means for locking said actuator against movement of said control surface in one direction following a failure of said primary no-back means, with said means for locking being operatively connected to sense and be triggered by an angular position of said eccentric arm.

21. The aircraft of claim 17 wherein:

said actuator includes a prime mover and a drive apparatus operatively connecting the prime mover to said control surface, said control surface thereby comprising a load moved by said drive apparatus;

said drive apparatus including a no-back mechanism comprising:

a shaft rotatable about an axis, and operably connected within said drive apparatus to be rotated by said prime mover or by movement of said control surface; and said first brake means;

with said first brake means being configured for resisting rotation of said shaft in one direction about said axis; and wherein both of said primary and secondary no-back means of said first brake means are configured for resisting said movement of said control surface in said one direction by resisting rotation of said shaft in said one direction, with said secondary no-back means only resisting said rotation in said one direction following a failure of said primary no-back means to resist said rotation in said one direction.

22. In a drive apparatus operatively connecting a prime mover to a load moved thereby along a path, a no-back mechanism including:

first brake means for resisting movement of said load in one direction along said path;

said first brake means including both a primary and secondary no-back means for resisting said movement of said load in said one direction along said path, with said secondary no-back means only resisting said movement in said one direction following a failure of said primary no-back means to resist said movement in said one direction along said path.

* * * * *